United States Patent [19]
Story

[11] 3,710,733
[45] Jan. 16, 1973

[54] INTEGRATED REINFORCED PLASTIC UNIT AND METHOD AND APPARATUS FOR MAKING THE SAME

[75] Inventor: William K. Story, Wilton Manors, Fla.

[73] Assignee: Plasteel Industries Incorporated, Fort Lauderdale, Fla.

[22] Filed: March 2, 1971

[21] Appl. No.: 120,086

Related U.S. Application Data

[63] Continuation-in-part of Ser. No. 66,748, Aug. 25, 1970, and a continuation-in-part of Ser. No. 66,749, Aug. 25, 1970.

[52] U.S. Cl. .................................... 108/51, 264/92
[51] Int. Cl. ............................................ B65d 19/00
[58] Field of Search .......... 108/51, 52, 53, 54, 55, 56, 108/57, 58; 156/144; 264/92; 161/121, 145, 36; 18/19, 35; 294/74, 67

[56] References Cited

UNITED STATES PATENTS

| | | | |
|---|---|---|---|
| 3,313,674 | 4/1967 | Mathews | 161/121 |
| 3,310,453 | 3/1967 | Lappala et al. | 161/121 |
| 3,167,341 | 1/1965 | Higgins | 108/58 |
| 3,228,358 | 1/1966 | Sepe et al. | 108/58 |
| 2,876,498 | 3/1959 | Nason | 264/92 |

Primary Examiner—Francis K. Zugel
Assistant Examiner—Garry Moore
Attorney—Andrus, Sceales, Starke & Sawall

[57] ABSTRACT

An integrated plastic unit and molding or thermoforming process and apparatus for producing the plastic unit from heated thermoplastic sheet material, such as polyethylene. The heated thermoplastic sheet material is placed over reinforcing forming members disposed on spacers which space the reinforcing forming members from the face of a mold, and the reinforcing members extend over substantially the entire face of the mold. The heated sheet material is then forced over the reinforcing forming members and over the face of the mold, such as by vacuum forming, to provide a generally flat surface extending in one plane and a bridging or web surface encapsulating the reinforcing forming members to provide a fused ribbed substructure of the thermoplastic sheet material reinforced by the forming members extending in a plane generally perpendicular to the flat surface. The reinforcing forming members may be metal members such as bars, wire, strip or rods, arranged in a grid-like network. The mold may be flat or of bowed configuration. The product is particularly utilized as a pallet for transportation by forklift trucks in which event legs are provided for the unit.

8 Claims, 10 Drawing Figures

INVENTOR
WILLIAM K. STORY
BY
ATTORNEYS

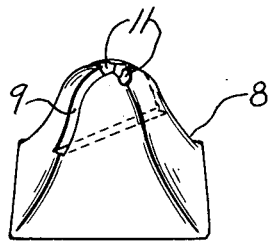
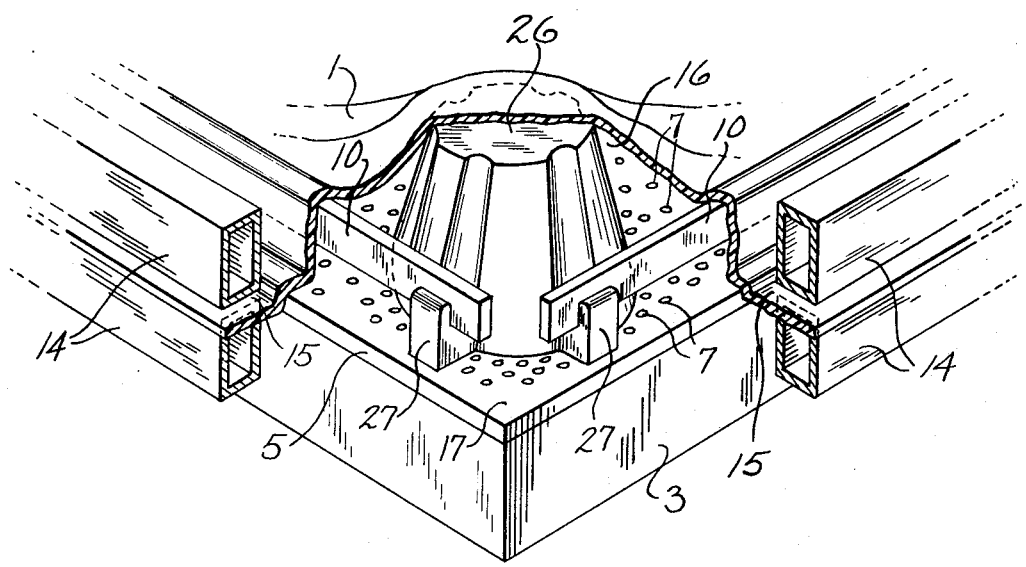
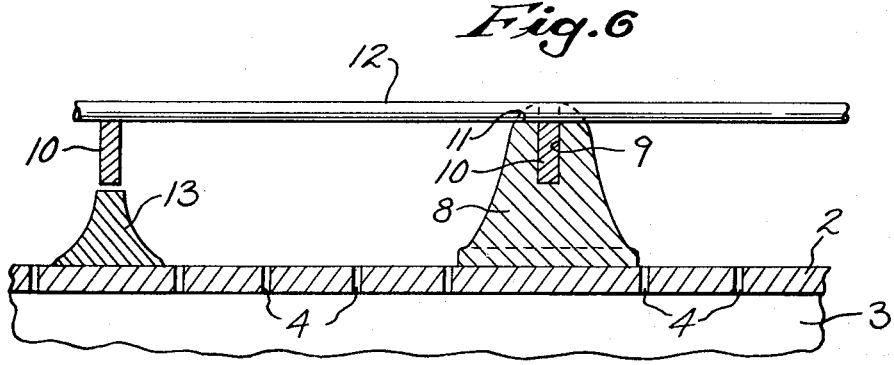
INVENTOR
WILLIAM K. STORY
BY
ATTORNEYS

INVENTOR
WILLIAM K. STORY

ATTORNEYS

INTEGRATED REINFORCED PLASTIC UNIT AND METHOD AND APPARATUS FOR MAKING THE SAME

This application is a continuation-in-part of application Ser. No. 66,748, entitled "Structure Molding Process," filed Aug. 25, 1970, by the present applicant; and application Ser. No. 66,749, entitled "Plastic Pallet Encompassing Metal Form," filed Aug. 25, 1970, by the present applicant.

BACKGROUND OF THE INVENTION

This invention relates to integrated reinforced plastic units which can be utilized for various structural and load bearing purposes, and is particularly useful as the deck of a pallet, for lifting and transportation by forklift trucks.

Many attempts have been made to produce a panel of synthetic materials, such as plastics, or the like, which might serve as a structural member or work receiving member. In the case of the use of such panels for pallets, for example, to increase strength, such synthetic pallets have been molded into a ribbed-type shape with elaborated molds being required to produce the rib-like structure which was necessary for increasing the strength of the synthetic pallet. This created a pallet in which the loading surface had rib-shaped indentations from the molding process, and yet the pallet was not rigid, and flexed under load.

The present invention overcomes these problems while increasing the strength of a synthetic pallet, such as of plastic, in which elaborate molds are not required for the construction, and in which the pallet has a substantially rigid flat working and lifting surface. The product of the invention is lightweight while still retaining structural lifting strength.

BRIEF DESCRIPTION OF THE INVENTION

The invention is directed to an integrated plastic unit and to the process and apparatus for producing such unit. The integrated unit essentially consists of two parts, namely, a generally flat panel section or deck, and a ribbed substructure which extends from the flat section and provides the rigidity for the unit. Under one method of producing the integrated plastic unit, a vacuum mold is provided which has a plurality of generally small holes therein through which a vacuum may be created at the face of the mold. In addition, the mold has a plurality of spacers on its face across which reinforcing forming members, such as metal bars and rods, are placed in a crisscrossed fashion to locate them substantially over the entire face of the mold in a grid or lattice-like network and spaced from the face of the mold. A thermoplastic sheet is then clamped along its edges and is heated. After heating, the sheet is drawn over the mold, either by pulling it over the mold and the reinforcing forming members or by raising the mold and the reinforcing forming members into the sheet. This results in sealing the edge portions of the sheet to the sides of the mold to provide an air-sealed space between the sheet and the mold. The air is then evacuated from this space by pumping the air therefrom out through the holes in the mold. This creates a lower pressure in the described space with respect to the atmospheric pressure on the outer side of the sheet and the vacuum action so draws the heated material over the reinforcing forming members that, adjacent the vacuum side, the surface created on the face of the mold will be flat, while above the flat surface, the plastic material will be contoured around the reinforcing forming members to encapsulate the same and thereby providing a ribbed substructure with the plastic material disposed as a bridge or rib between the reinforcing forming members and the flat surface of the unit. In use, the flat side will be the load bearing and positioning side, in the event the deck of the unit is used as a pallet or the like, for the materials to be transported while the ribbed side will be engaged by a forklift vehicle or the like. In the event the unit is used as the deck of a pallet, integral legs, for example, may be molded from the heated material on the ribbed side of the deck at a sufficient height above the ground or floor to receive the lifting arms of a fork truck or the like. The rib-like substructure is preferably a combination of metal rods and rectangular bars as described. However, even a mesh structure, such as a widely threaded wire or screen, could be used as the reinforcing forming means, or non-metallic materials may be employed, such as of plastic or fibrous material. In any event, the material utilized, when in place over the mold, should be rigid or taut, and spaced from the mold a sufficient distance to provide a form around which the thermoplastic sheet can be forced or flowed, so as to encapsulate the form and provide a bridge or rib between the form and the generally flat surface of the integrated unit. The form remains within the plastic material to act as a reinforcement for such material.

The spacers referred to above also act as fillets to prevent the plastic material as it flows from thinning out to such an extent as to tear holes in it. Additional fillets of lesser height may be provided beneath the intersection of the bars and rods of the reinforcing forming members to decrease the flow of the plastic material in these areas where the flowing material meets.

DESCRIPTION OF THE DRAWINGS

The drawings illustrate the best mode presently contemplated of carrying out the invention.

In the drawings:

FIG. 3 is a perspective view of a mold spacer;

FIG. 4 is a perspective view of a button-like fillet;

FIG. 5 is a perspective view with parts in section illustrating the sheet sealed to the mold and extending over a leg former with a vacuum partially applied;

FIG. 6 is a section taken on line 6—6 of FIG. 1;

Referring to the drawings, there is illustrated in FIGS. 1 and 2, the vacuum molding or thermoforming apparatus of the invention and the sheet 1 of the preheated plastic material or the like, which is to be formed into the desired integrated plastic unit. In FIG. 1, the mold 2 consists of a metal plate of aluminum or the like, of the size and shape of the integral reinforced plastic unit, which is to be produced. The mold 2 rests upon the vacuum box 3, which is connected to a pump or the like, not shown, and box 3 is provided with an opening, not shown, to the inner surface of mold 2, so that a pressure differential may be established on the face of the mold when the molding operation is being effected. Mold 2 is provided with a plurality of small holes 4, as seen in FIG. 6, so that the air may be evacuated from the face of the mold when sheet 1 is sealed to it for thermoforming.

FIG. 2 illustrates a bowed or curved mold 5 which has a box 3 corresponding to that of mold 2 and likewise is connected to a power source for evacuation of the surface of the mold 5 through the small holes 7 therein and which are interspaced throughout mold 5.

The small holes in molds 2 and 5 have a diameter of the order of 0.012 to 0.125 inches.

Figure 1:
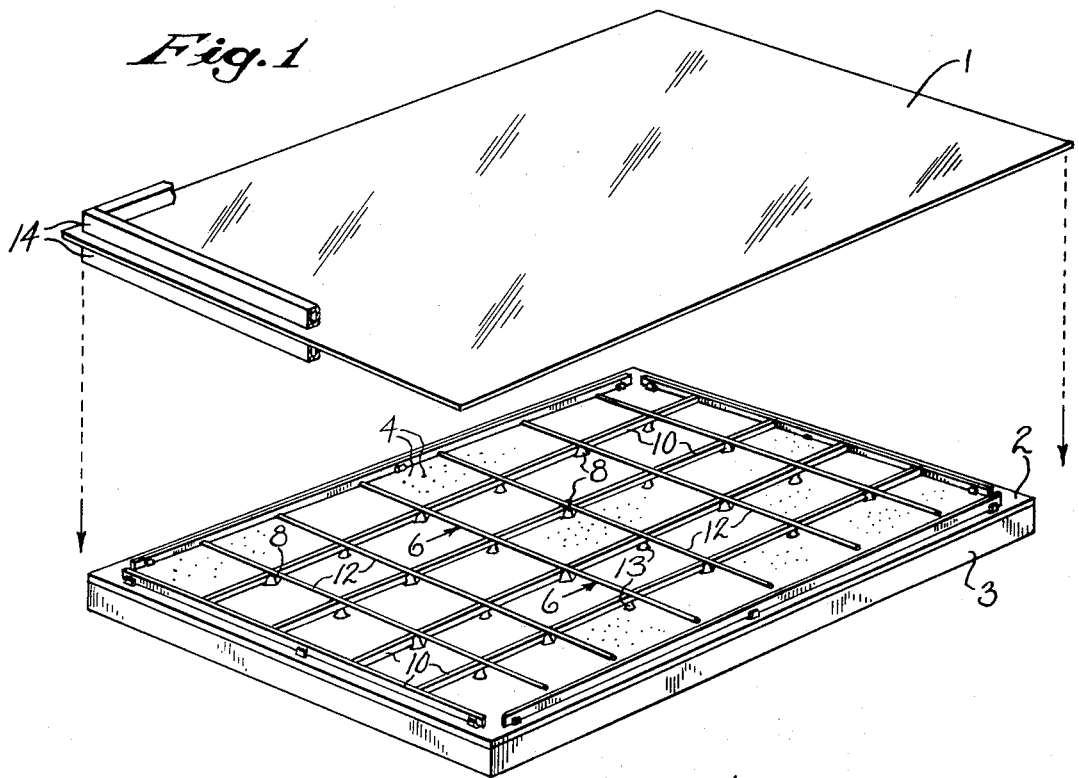
FIG. 1 is a perspective view illustrating a thermoplastic sheet which has been heated and clamped in position to receive a flat mold and reinforcing forming members.
Figure 2:
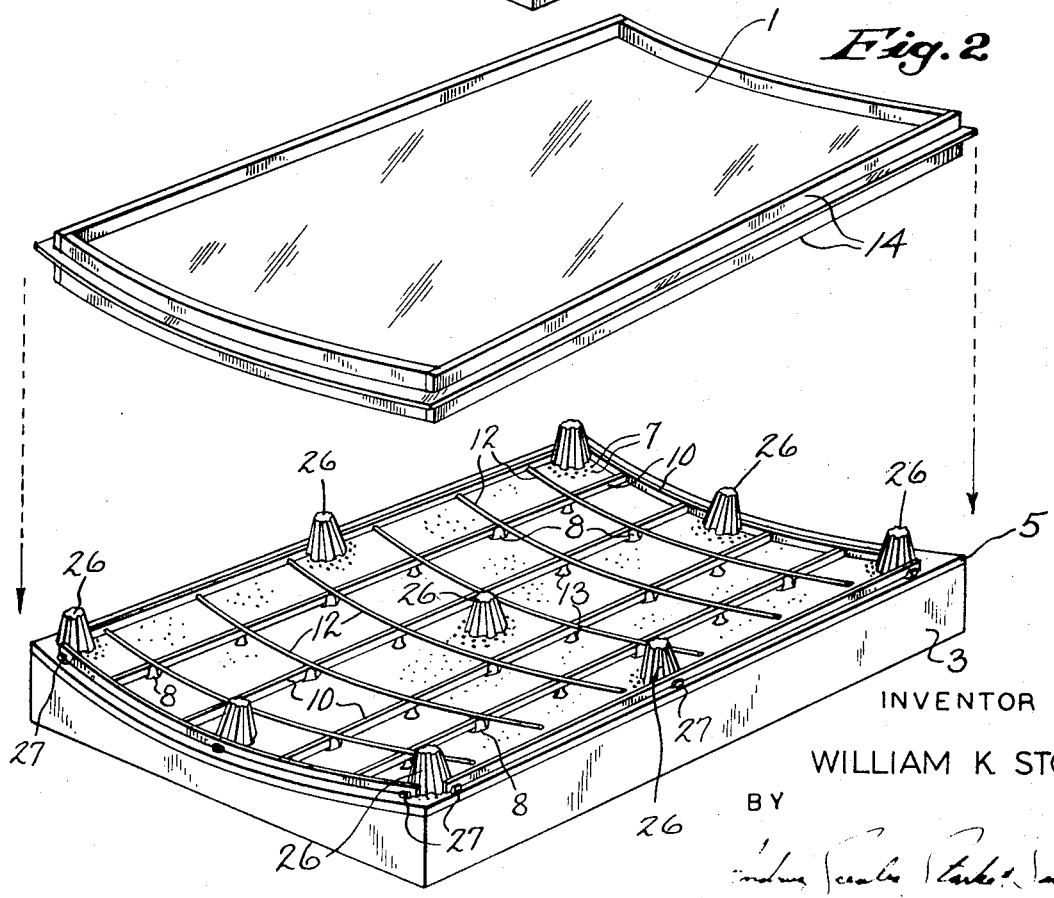
FIG. 2 is a view similar to FIG. 1 in which the mold is bowed in one direction and has pallet leg formers thereon.

As described, FIG. 1 illustrates the generally flat mold 2, whereas FIG. 2 illustrates the curved or bowed mold 5. However, the faces of the molds may take other contours than those shown, depending upon the integrated plastic product which it is desired to mold. If the flat or straight mold 2 is employed to form the heated sheet 1 into the product desired, it has been found that it may be necessary to straighten the final product since the shrinkage of the material of sheet 1 upon cooling may cause the edge portions of the deck or panel to curve upwardly, which then requires flattening for proper utilization of the product. However, if a bowed or curved mold 5 is employed, when the formed material of heated sheet 1 cools, the final product will be in a straight condition so that a final flattening operation may be eliminated. The radius of the bow in mold 5 will depend on the size and shape of the mold, the composition of the material employed in sheet 1, and the size and shape of the reinforced forming members. When the bowed mold 5 is utilized, sheet 1, as shown in FIG. 2, is clamped in the general bowed shape of mold 5.

The faces of molds 2 and 5 are provided along spaced longitudinal and transverse lines with spacer members 8, which project away from the face of molds 2 and 5, a distance of approximately 1⅛ inches and may be of the configuration shown in FIG. 3. The spacers 8 taper inwardly from the base to the free ends thereof so that the plastic material to be formed can readily flow over the spacers 8 in the forming operation, and also the taper permits the product formed on the mold to be more readily removed. The spacers 8 are provided with a relatively deep notch 9 in one direction to receive respectively, flat metal bars 10 which extend in one direction across the face of the molds, and a relatively shallow notch 11 located above notch 9, which extends in each spacer 8 transverse to the notch 9. The shallow notches 11 receive the metal rods 12, which lie above bars 10 and extend transversely of bars 10. The notches 9 and 11 hold the respective bars and rods securely in place in a grid-type network and in spaced relation to the face of molds 2 and 5, so that the plastic material during forming can flow down the sides and under the bars 10 and rods 12, and over the face of the molds 2 and 5. Satisfactory results have been obtained when the bottom of the deep notch 9 is approximately one-half inch from the face of molds 2 and 5 to thereby provide a spacing of this dimension between the reinforcing forming members provided by bars 10 and rods 12 and the face of the molds. The distance of the reinforcing members from the face of the molds depends upon the surface thickness to be created. In order to strengthen the integrated reinforced plastic unit, the edge portions are provided with the bordering or perimeter bars 10 which are supported on spacer members 8 along the edge portions of molds 2 and 5.

In the bowed mold 5, illustrated in FIG. 2, the bars 10 are straight but the rods 12 are curved to the general contour of mold 5 and in this mold the bordering bars 10 are also curved to the general shape of the bow of mold 5 whereas all the other bars 10, including the bordering bars 10 at the edge portions of the mold 5 extending transversely of the bow or curvature of the mold are straight. When the material of sheet 1 is molded into place, the shrinkage of the material in sheet 1 straightens the bowed bordering bars 10 and the bowed rods 12 so that the deck or panel of the product will lie in a substantially flat plane.

In order to prevent excessive thinning out of the material of plastic sheet 1 beneath the cross-over areas of the bars 10 and rods 12, conical button-like fillets 13, as especially illustrated in FIGS. 4 and 6, may be secured to the molds 2 and 5 to dam the flow of the plastic material at these areas.

Sheet 1 is generally of a thermoplastic material such as polyethylene, polystyrene, acrylonitrile-butadiene-styrene, polyvinyl chloride, cellulose-acetate-butyrate, polypropylene, acrylics and the like. The heating of sheet 1 is not shown, since this is well known and may be accomplished in numerous ways, either separately or on the mold. During heating and assembly of sheet 1 with, for example, the mold 5, the edges of sheet 1 are clamped and held by the clamps 14 which are shown in part in FIGS. 1, 2 and 5 of the drawings. In FIG. 1, since the sheet 1 is straight, the clamps 14 would be straight whereas the clamps 14 would be bowed in one direction to shape sheet 1 to the bow of mold 5. The sheet 1, after heating, is in a pliable condition so that it will readily flow when pressure is applied to it, but remains rigid enough so that it can be held by the clamps 14. The temperature of the sheet 1 will vary depending on the composition of the material of sheet 1 and the thickness of the sheet. The thickness of sheet 1 will be governed by the integrated reinforced plastic unit which it is desired to produce, depending on such factors as the weight, thickness, and strength of material requirements in the final unit, and economic requirements. A polyethylene sheet of one-fourth inch in thickness has produced satisfactory pallets.

The preheated sheet 1 as illustrated, for example in FIG. 2, is slightly greater in size than mold 5 so that clamps 14, as shown in FIG. 5, can draw sheet 1 over the edges of the mold and seal the edge portions 15 of the sheet which lies inside clamps 14 against the sides of the mold 5. This provides the space 16 between sheet 1 and the face 17 of mold 5 which is sealed against entry of air. When a vacuum is then drawn through holes 7 in the mold 5, a lower pressure is established in space 16 by evacuation of the air from space 16 compared to the pressure on the outside of sheet 1, and the plastic sheet 1 is thereby forced toward the mold by the greater atmospheric pressure. The material of sheet 1 then flows around and underneath the reinforcing forming members provided by bars 10 and rods 12 to completely encapsulate them. After the material of sheet 1 has flowed around the reinforcing forming members, the material is drawn to the face 17 of the mold in such a manner as to form a flat surface directly adjacent the face of the mold and underneath the reinforcing forming members.

The bars 10 and rods 12 thus provide a form around which the material of sheet 1 flows. Any pressure differential technique in which a uniform higher pressure is applied to the exposed side of the preheated plastic sheet 1 than exists between sheet 1 and mold 5 to effect uniform flow of the material toward the mold, could be employed or mechanical means might be used to force the plastic sheet 1 to take the form of the mold and encapsulate the reinforcing forming members.

Figure 8:
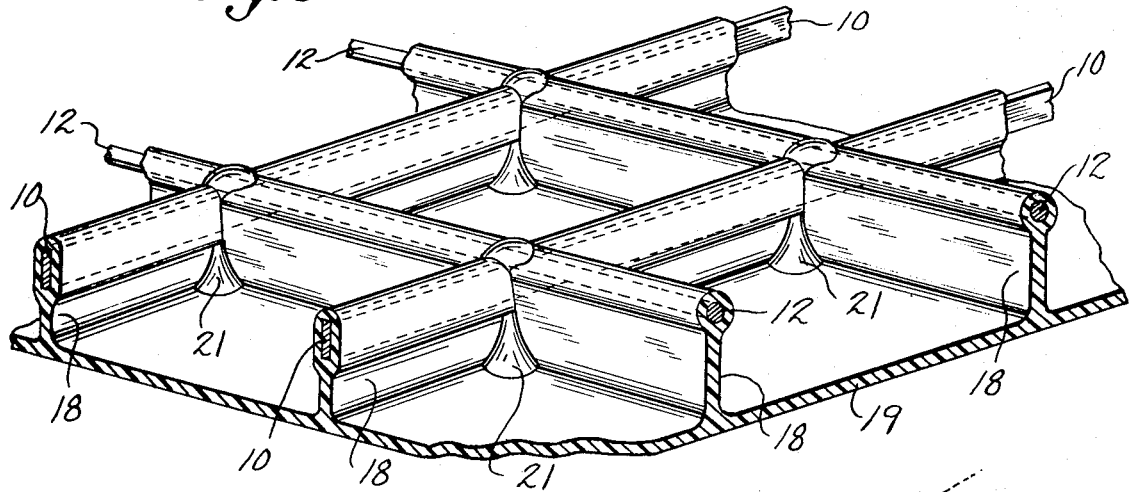
FIG. 8 is a perspective view with parts in section of a part of a panel or deck as it appears when the forming operation is completed and without any legs molded thereto.

The material of plastic sheet 1, upon encapsulation of the bars 10 and rods 12 or other reinforcing members which may be employed, is fused or melded into a single, continuous rib 18, as shown in FIG. 8, which lies between the flat portion 19 of the deck or panel, and is uninterrupted by any hairline crevice or the like. Consequently, the ribs 18 and the bars 10 and rods 12 encapsulated therein, provide a grid-like substructure for flat portion 19 which gives substantial rigidity to the structure. Slight depressions 20 also may be formed in the face of the unit by the spacers 8 and button-like fillets 13. However, these depressions do not affect the strength or usability of the completed unit.

The button-like fillets 13, previously described, act as dams to provide filleted corners 21 at the cross-over areas of the bars 10 and rods 12 to supply strength at those areas in the plastic material of sheet 1 which, without the use of fillets 13, may thin out to a point where the material would tear.

Figure 10:
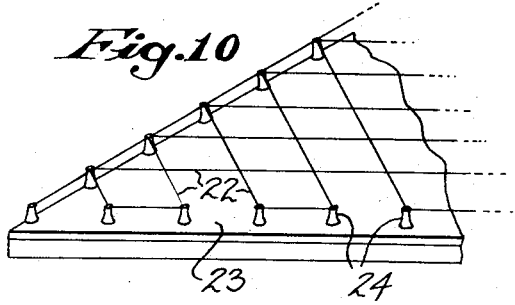
FIG. 10 is a view of a mold illustrating the use of a non-metallic cord-like material.

Although the bars 10 and rods 12 are shown crisscrossed at right angles to each other, any arrangement of the forming means could be used, so long as the substructure is of a construction to strengthen the final product. FIG. 10 illustrates another embodiment of the invention wherein a fibrous cord 22, such as of nylon, glass, hemp or the like, is stretched taut over the mold 23 in a diagonal pattern and secured to the spacers 24 shown as secured to the face of mold 23 to space cord 22 from the mold. A preheated sheet material, such as the thermoplastic sheet 1, is then formed about the cord 23, as previously described with respect to bars 10 and rods 12, to encapsulate the same and provide a ribbed structure and a generally flat body portion or panel corresponding to that shown in FIG. 8.

In the event that it is desired to make the integral reinforced plastic unit usable as a pallet, legs 25 may be provided in various ways on the ribbed side of the panel or deck of sufficient height so that fork arms may be easily moved in and out from under the unit.

Figure 7:
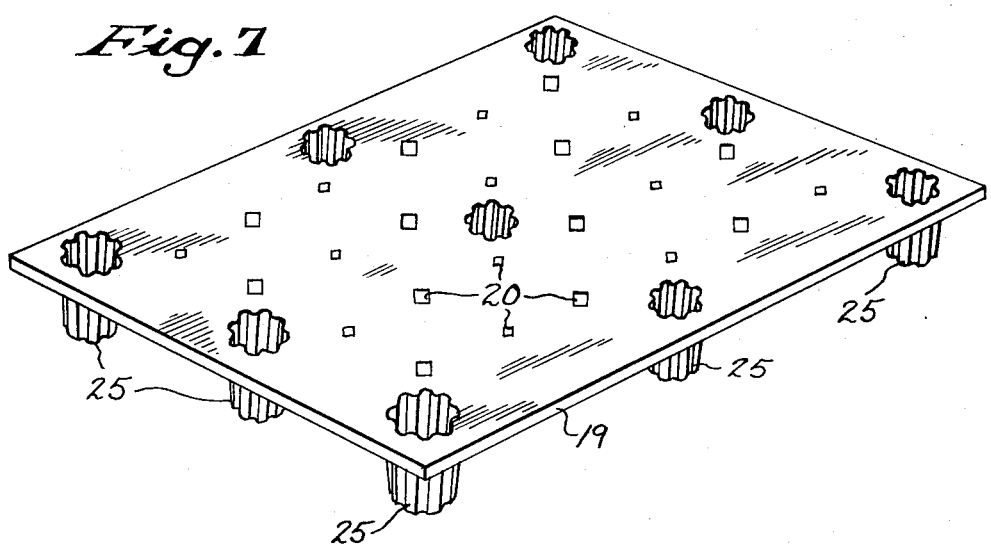
FIG. 7 is a perspective view of a completed pallet.

The legs 25 shown in FIG. 7 are shown as having been integrally molded into the unit when it was formed. This is accomplished by providing the fluted leg formers 26 on the face of the mold such as are shown on the bowed mold 5. FIG. 5 illustrates the heated sheet 1 clamped into position over one of the fluted leg formers 26 on mold 5, and when the vacuum is drawn, the legs 25 are molded by the leg formers 26, with a fluted construction to give them strength. Because there are legs 25 adjacent to the edge portions of the pallet, it is desirable to provide the spacers 27 as a part of leg formers 26 to receive the bordering bars 10 the same as spacers 8 which reinforce the edge or border portions of the deck of the pallet.

Figure 9:
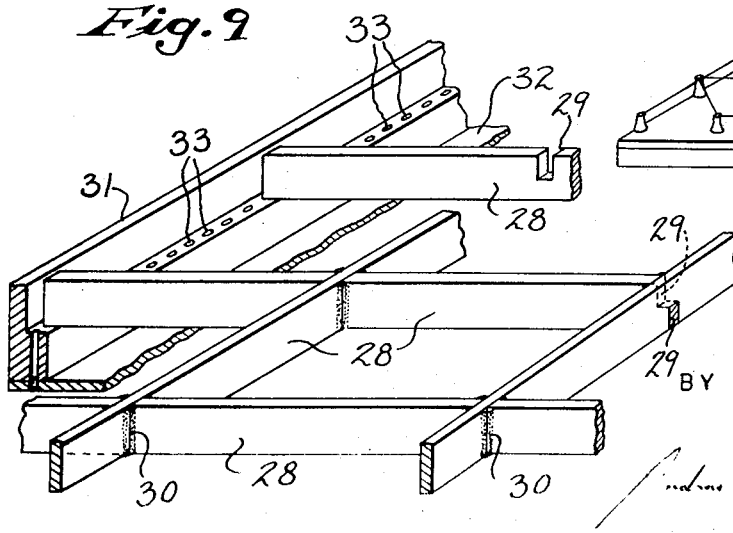
FIG. 9 is a perspective view of a welded grid or reinforcing forming members supported only on the periphery of a mold.

It may be desirable to provide the reinforcing forming members as a welded grid. This construction is illustrated in FIG. 9. There the crossed pieces are corresponding metal bars 28 which are notched as at 29 to lie at the same level where they cross and are joined together at the notched crossing area by welds 30. The bars 28 are supported on spacers illustrated by spacer 31 which extend along the entire periphery of the mold 32, and the holes 33 are provided in the spacers for drawing a vacuum along the edge of the mold. The bars could take other configurations or be rod-like members and could be supported by intermittent spacers along the periphery of the mold 32 corresponding to the spacers 8, or which may be mounted on the face of the mold as in FIGS. 1 and 2.

In carrying out the method of the invention, the sheet 1 is initially heated to temperatures of around 275° F., depending on the composition of sheet 1. During the heating of the sheet, the reinforcing forming members, consisting of bars 10 and rods 12, or similar type rigid or tautly held forming members, are laid into the spacers 8 in a crisscrossed configuration. The heated sheet is then drawn over the reinforcing forming members and the mold, such as mold 5, and the edge portions of sheet 1, are sealed to mold 5. A vacuum is then drawn in the air-sealed space 16 between face 17 of the mold and the inside of sheet 1. The heated material of sheet 1 thereby is caused under atmospheric pressure to flow and fuse together around the reinforcing forming members, so as to encapsulate them and form into an uninterrupted rib section, as well as providing a flat surface over the face of the mold under the rib section. After cooling and removal from the mold, the completed unit has a flat panel or deck section and an integral substructure of grid-like appearance which provides substantial rigidity and strength to the unit. In addition, if metal members are employed in the grid substructure, these are protected by the encapsulating plastic from corrosion in service. In the event legs are required to use the unit as a pallet or the like, these may be integrally molded into the unit during the forming operation.

Although the description has been directed to a flat panel or deck, it is also contemplated that the panel or deck of the unit may be curved or of other contour such as a tub or tote tray. However, in any event, the line of support of the substructure would extend in a plane generally perpendicular to the plane of the area on the panel or deck from which the ribs extend.

Various modes of carrying out the invention are contemplated as being within the scope of the following claims particularly pointing out and distinctly claiming the subject matter which is regarded as the invention.

I claim:

1. An integrated reinforced plastic unit which comprises generally rigid reinforcing forming means, a one-piece preformed thermoplastic sheet of material assembled with said reinforcing forming means with the first portion of said sheet material extending in opposite directions in a plane parallel to and spaced from the reinforcing forming means and overlying said reinforcing forming means to provide the outer surface of said first portion as an exposed working surface, and a second portion of the thermoplastic material encapsulating the reinforcing forming means and providing fused ribs of the material extending from the reinforcing forming means in a plane substantially perpendicular to the first named portion and to the reinforcing forming means, said fused ribs combining with the reinforcing forming means to supply rigidity to the plastic unit.

2. The integrated plastic unit of claim 1 in which the reinforcing forming means are members assembled in a criss-crossed configuration, and fillets of the sheet material provided at the crisscrossed areas of the members between the first and second portions of the sheet of material.

3. The integrated plastic unit of claim 1, in which the reinforced plastic unit is a pallet and the reinforcing forming means are members assembled in a criss-crossed configuration.

4. The integrated plastic unit of claim 1, in which the reinforced plastic unit is a pallet and the reinforcing forming means are metal members.

5. The integrated plastic unit of claim 3, in which the reinforcing forming means are metal members which are welded together at the areas where they cross each other.

6. The integrated plastic unit of claim 1, in which the reinforced plastic unit is a pallet and the reinforcing forming means are of non-metallic material.

7. The integrated plastic unit of claim 1, in which the thermoplastic material is polyethylene, and supporting legs integrally molded as a part of the first-named portion of the material and projecting substantially perpendicular thereto a relatively short distance therefrom to provide the plastic unit for use as a pallet.

8. A loading pallet comprising metal reinforcing members assembled in a crisscross configuration, a one-piece thermoformed sheet of thermoplastic material with one portion encapsulating the reinforcing members and extending therefrom to a second portion of the sheet having a generally flat configuration with fused ribs of the sheet material disposed between the encapsulating portion of the sheet material and the generally flat portion, and fillets of the sheet material provided at the crisscross areas of the reinforcing members between the first-named portion of the material and the generally flat portions.

* * * * *